United States Patent
Kim (10) Patent No.: US 10,174,684 B2
(45) Date of Patent: Jan. 8, 2019

(54) METHOD OF CONTROLLING CONTINUOUSLY VARIABLE VALVE TIMING SYSTEM FOR LIMP-HOME

(71) Applicants: Hyundai Motor Company, Seoul (KR); Kia Motors Corporation, Seoul (KR)

(72) Inventor: Sung Joo Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 182 days.

(21) Appl. No.: 15/280,794

(22) Filed: Sep. 29, 2016

(65) Prior Publication Data
US 2017/0167410 A1 Jun. 15, 2017

(30) Foreign Application Priority Data
Dec. 14, 2015 (KR) .................. 10-2015-0178539

(51) Int. Cl.
*F02D 13/02* (2006.01)
*F01L 1/047* (2006.01)
(Continued)

(52) U.S. Cl.
CPC .......... *F02D 13/0219* (2013.01); *F01L 1/047* (2013.01); *F01L 1/3442* (2013.01);
(Continued)

(58) Field of Classification Search
CPC ............. F02D 13/0219; F02D 41/2464; F02D 2041/001; F02D 41/221; F02D 2250/16;
(Continued)

(56) References Cited

U.S. PATENT DOCUMENTS 5,604,304 A * 2/1997 Kokubo ............... F02D 41/009
701/101
5,870,986 A * 2/1999 Ichinose ............... F02D 41/062
123/179.16
(Continued)

FOREIGN PATENT DOCUMENTS

JP 2006-161631 A 6/2006
JP 2006-220154 A 8/2006
KR 10-1439034 B1 9/2014

*Primary Examiner* — Jason Newton
(74) *Attorney, Agent, or Firm* — Morgan, Lewis & Bockius LLP (57) ABSTRACT

A method of controlling a continuously variable valve timing system, may include determining whether there is an error of a position of a cam, performing a passive control based on a value learned about a position of the cam during previous driving when it is determined that there is an error of the position of the cam, determining whether a motion of the continuously variable valve timing system is stopped while the passive control is performed based on the value learned about the position of the cam during the previous driving, learning the stopping position of the continuously variable valve timing system when it is determined that the motion of the continuously variable valve timing system is stopped, and learning a position for limp-home of the continuously variable valve timing system and then controlling the continuously variable valve timing system to the learned position for the limp-home.

15 Claims, 9 Drawing Sheets

(51) Int. Cl.
  *F01L 1/344* (2006.01)
  *F02D 41/24* (2006.01)
  *F02D 41/22* (2006.01)
  *F02D 41/00* (2006.01)

(52) U.S. Cl.
  CPC ............... *F02D 41/2464* (2013.01); *F01L 2001/34453* (2013.01); *F01L 2001/34459* (2013.01); *F01L 2250/02* (2013.01); *F01L 2250/06* (2013.01); *F01L 2800/11* (2013.01); *F01L 2800/12* (2013.01); *F02D 41/221* (2013.01); *F02D 2041/001* (2013.01); *F02D 2250/16* (2013.01); *Y02T 10/18* (2013.01)

(58) Field of Classification Search
  CPC ............... F01L 1/047; F01L 1/3442; F01L 2001/34453; F01L 2001/34459; F01L 2800/11; F01L 2800/12; F01L 2250/02; F01L 2250/06; Y02T 10/18
  USPC .......................................................... 123/90.15
  See application file for complete search history.

(56) References Cited

U.S. PATENT DOCUMENTS

| | | | |
|---|---|---|---|
| 2013/0025568 A1* | 1/2013 | Yokoyama | F01L 1/3442 123/445 |
| 2013/0110382 A1* | 5/2013 | Ishikawa | F02N 11/0848 701/112 |
| 2017/0167410 A1* | 6/2017 | Kim | F01L 1/047 |
| 2018/0100461 A1* | 4/2018 | Eom | F02D 41/062 |

* cited by examiner

METHOD OF CONTROLLING CONTINUOUSLY VARIABLE VALVE TIMING SYSTEM FOR LIMP-HOME

CROSS-REFERENCE TO RELATED APPLICATION

The present application claims priority to Korean Patent Application No. 10-2015-0178539, filed Dec. 14, 2015, the entire contents of which is incorporated herein for all purposes by this reference.

BACKGROUND OF THE INVENTION

Field of the Invention

The present invention relates to a method of controlling a continuously variable valve timing system for limp-home. More particularly, the present invention relates to a method of controlling an intermediate phase continuously variable valve timing system for limp-home of a CVVT system.

Description of Related Art

Generally, a continuously variable valve timing (CVVT) apparatus refers to an apparatus which adjusts opening and closing timing of a valve of an engine. Particularly, as the CVVT system controls an intake valve in accordance with a driving condition, output of the engine and fuel efficiency may be improved, and exhaust gas may be reduced.

The opening and closing operations of exhaust and intake valves are performed by a rotation of a camshaft, and a continuously variable valve timing system can control opening/closing timing of a valve by relative phase change of a camshaft.

A general CVVT system is a hydraulic vane type CVVT system. The vane type CVVT system is provided in a small space, and has a merit of being inexpensive.

However, because the vane type CVVT system uses lubricant of the engine as working oil, there is a drawback in that it is difficult to expect fast and accurate response in a state in which pressure of oil is low. Particularly, in a case in which pressure of engine oil is not sufficient, such as in an idle state of the engine, in a high temperature state, in a start state, or the like, a relative phase variation of the camshaft is difficult, and excessive leakage of exhaust gas may occur. In addition, by a shortfall of pressure of oil and excessive viscosity of oil at the time of cold starting, an operation of the hydraulic CVVT system may be impossible. Therefore, starting is performed at a parking position fixed by a lock pin.

Meanwhile, in case that a parking position fixed by the lock pin is a maximal advance or a maximal retardation, responsiveness may be deteriorated and area of operating a cam may be limited.

Recently, an intermediate phase CVVT system having a parking position which is not a maximal advance or a maximal retardation but an intermediate phase between them has developed to solve the problem. That is, if an intermediate phase continuously variable valve timing system is applied, responsiveness can be improved and area of operating a cam may be expanded.

However, when the control of the lock pin is not properly performed in a general technology electrically controlling the operation of the lock pin by a solenoid, problems such as impossibility of operating a CVVT system by malfunction of releasing the lock or oscillation of a cam by malfunction of parking the lock pin may be generated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling a continuously variable valve timing system for limp-home of an intermediate phase continuously variable valve timing (CVVT) system, having advantages of facilitating parking by a lock pin even during electrical malfunction of the lock pin.

In addition, various aspects of the present invention are directed to providing a method of controlling a continuously variable valve timing system for limp-home having further advantages of fixing phase of a cam to a predetermined position in case that parking by the lock pin is not possible.

According to various aspects of the present invention, a method of controlling a continuously variable valve timing system, which selectively controls opening and closing timing of a valve according to rotation of a cam by changing relative phase between a rotor and a stator, and is configured so that the rotor is selectively parked through a lock pin, for limp-home, including determining, by a controller, whether there is an error of a position of the cam, performing, by the controller, a passive control based on a value learned about a position of the cam during previous driving when it is determined that there is an error of the position of the cam, determining, by the controller, whether a motion of the continuously variable valve timing system is stopped while the passive control is performed based on the value learned about the position of the cam during the previous driving; learning, by the controller, the stopping position of the continuously variable valve timing system when it is determined that the motion of the continuously variable valve timing system is stopped, and learning, by the controller, a position for limp-home of the continuously variable valve timing system and then controlling, by the controller, the continuously variable valve timing system to the learned position for the limp-home.

The controller may perform uniform control regardless of an error relating to controlling of the lock pin.

The determining the error of the cam position may be performed based on a predetermined reference position of the cam.

The continuously variable valve timing system may be controlled in a regular manner when it is determined that there is no error of the position of the cam.

The passive control based on the value learned about the position of the cam during the previous driving may be continuously performed when it is determined that the continuously variable valve timing system is moved.

The passive control may be performed such that the cam is set to a maximal advance position or a maximal retardation position in a case that learning about a position for limp-home of the continuously variable valve timing system is not possible.

The determining whether there is the error of the position of the cam may be simultaneously started with an engine starting.

The controlling the continuously variable valve timing system to the learned position for the limp-home may be ended when an engine starting is stopped.

The maximal advance position may be the position for limp-home in a case in which the stopping position of the continuously variable valve timing system during the passive control of the continuously variable valve timing system is a position of relatively moving the stator toward an advance direction.

The maximal retardation position may be the position for limp-home in a case in which the stopping position of the continuously variable valve timing system during the passive control of the continuously variable valve timing system is a position of relatively moving the stator toward a retardation direction.

A parking position of the rotor may be the position for limp-home in a case in which the stopping position of the continuously variable valve timing system during the passive control of the continuously variable valve timing system is the parking position of the rotor.

A predetermined position between the parking position of the rotor and the maximal advance position may be the position for limp-home in a case in which the stopping position of the continuously variable valve timing system during the passive control of the continuously variable valve timing system is a position of relatively moving the stator toward an advance direction.

A predetermined position between the parking position of the rotor and the maximal retardation position may be the position for limp-home in a case in which the stopping position of the continuously variable valve timing system during the passive control of the continuously variable valve timing system is a position of relatively moving the stator toward a retardation direction.

The position of the rotor for determining that the stopping position of the continuously variable valve timing system is the parking position of the rotor may be within a predetermined range.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1A:
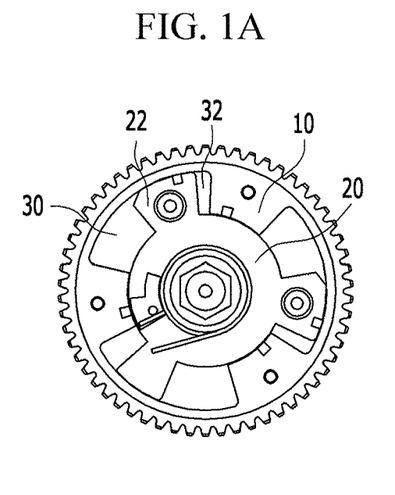
FIG. 1A, FIG. 1B, and FIG. 1C are partial schematic diagrams of an intermediate phase continuously variable valve timing (CVVT) system which is operated by a method of controlling a continuously variable valve timing system for limp-home according to various embodiments of the present invention.
Figure 1B:
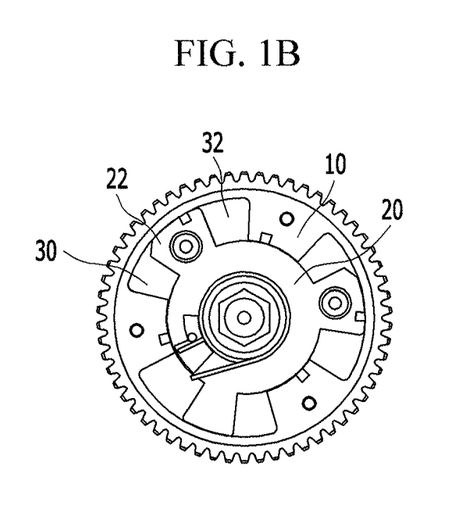
Figure 1C:
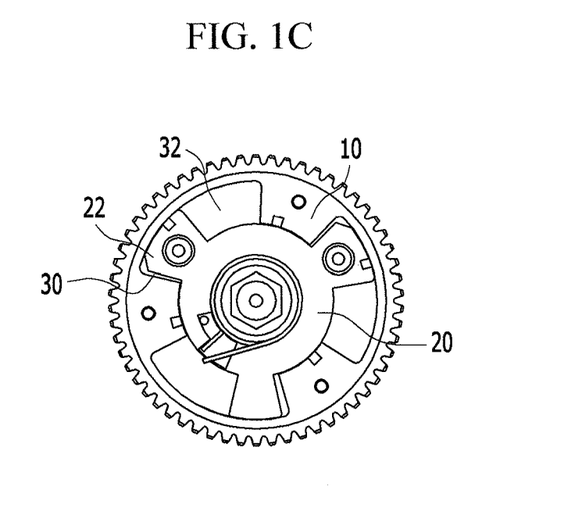

FIG. 1 is a partial schematic diagram of an intermediate phase continuously variable valve timing system which is operated by a method of controlling a continuously variable valve timing system for limp-home according to various embodiments of the present invention.

As shown in FIGS. 1A-1C, the continuously variable valve timing system (CVVT system) 1 includes a rotor 20, a stator 10, and a vane 22. In addition, a gear or a chain may be mounted to the CVVT system 1.

The gear or the chain sprocket may be connected with a gear or a sprocket, which rotates together with crankshaft, by a belt or a chain so as to synchronize rotation of the engine with rotation of the camshaft. In addition, relative phase between the rotor 20 and the stator 10 is changed and opening and closing timing of the valve is varied as the vane 22 formed at the rotor 20 is moved by hydraulic pressure such that the rotor 20 rotates.

FIG. 1A shows a state that the rotor 20 is operated to realize the valve opening and closing timing with the maximal advance, FIG. 1B shows a state in which the rotor 20 is parked on the intermediate phase, and FIG. 1C shows a state that the rotor 20 is operated to realize the valve opening and closing timing with maximal retardation.

The basic configuration and operation of the CVVT system 1 is well known to a person of an ordinary skill in the art, so detailed description thereof will be omitted.

Figure 2:
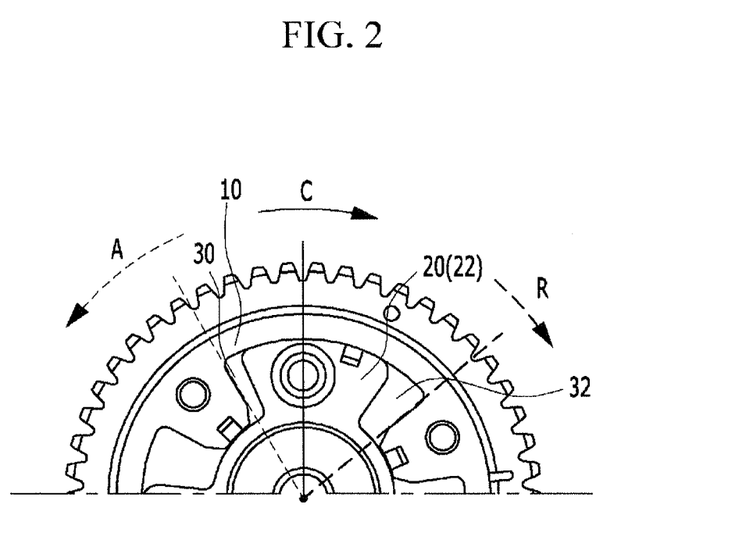
FIG. 2 is a drawing showing operation regions of the intermediate phase continuously variable valve timing system according to various embodiments of the present invention.
Figure 3:
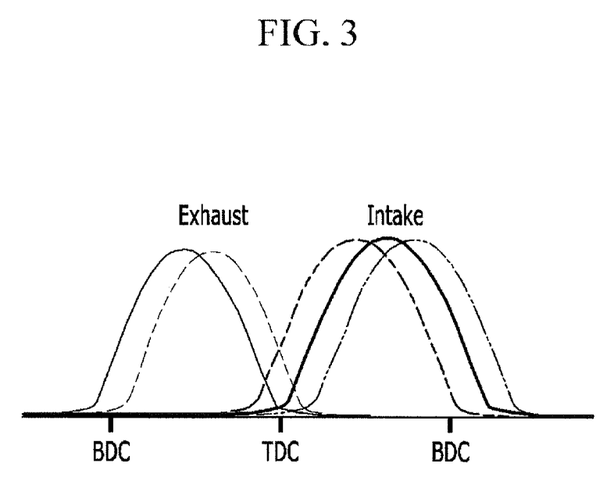
FIG. 3 is a graph showing valve timing which is varied by the intermediate phase continuously variable valve timing system according to various embodiments of the present invention.

FIG. 2 is a drawing showing operation regions of an intermediate phase continuously variable valve timing system according to various embodiments of the present invention, and FIG. 3 is a graph showing valve timing which is varied by an intermediate phase continuously variable valve timing system according to various embodiments of the present invention.

As shown in FIGS. 1A-1C and FIG. 2, the CVVT system 1 further includes a first chamber 30 and a second chamber 32.

The first chamber 30 and the second chamber 32 are spaces which are surrounded the stator 10, the rotor 20, and the vane 22 such that hydraulic pressure is supplied thereto, and the vane 22 is operated depending on difference between hydraulic pressure being supplied to the first chamber 30 and hydraulic pressure being supplied to the second chamber 32. In addition, the rotor 20 rotates toward an advance direction changing phase of the cam such that the valve timing of the valve is advanced when hydraulic pressure is supplied to the first chamber 30, and the rotor 20 rotates toward a retardation direction changing phase of the cam such that the valve timing of the valve is retarded when hydraulic pressure is supplied to the second chamber 32. In FIG. 2, the advance direction (A), the retardation direction (R), and the rotating direction (C) of the camshaft 3 are illustrated with arrows.

As shown in FIG. 2 and FIG. 3, CVVT system 1 is the intermediate phase CVVT system 1 having a parking position which is not a maximal advance or a maximal retardation but an intermediate phase between them, and the rotor 20 of the intermediate phase CVVT system 1 may have a rotation angle of about 50 degree as operation regions for relatively moving the stator 10 toward the advance direction (A) and a rotation angle of about 30 degree as operation regions for relatively moving the stator 10 toward the retardation direction (R). This is to increase operation regions in comparison with an ordinary CVVT apparatus having a parking position which is the maximal advance or the maximal retardation. In FIG. 3, a graph according to profile of a cam on a maximal advance position in which the rotor 20 is operated by rotation angle of about 50 degrees, is illustrated with a one point chain line, and a graph according to a profile of a cam on a maximal retardation position in which the rotor 20 is operated by rotation angle of about 30 degrees, is illustrated with a two point chain line.

Figure 4:
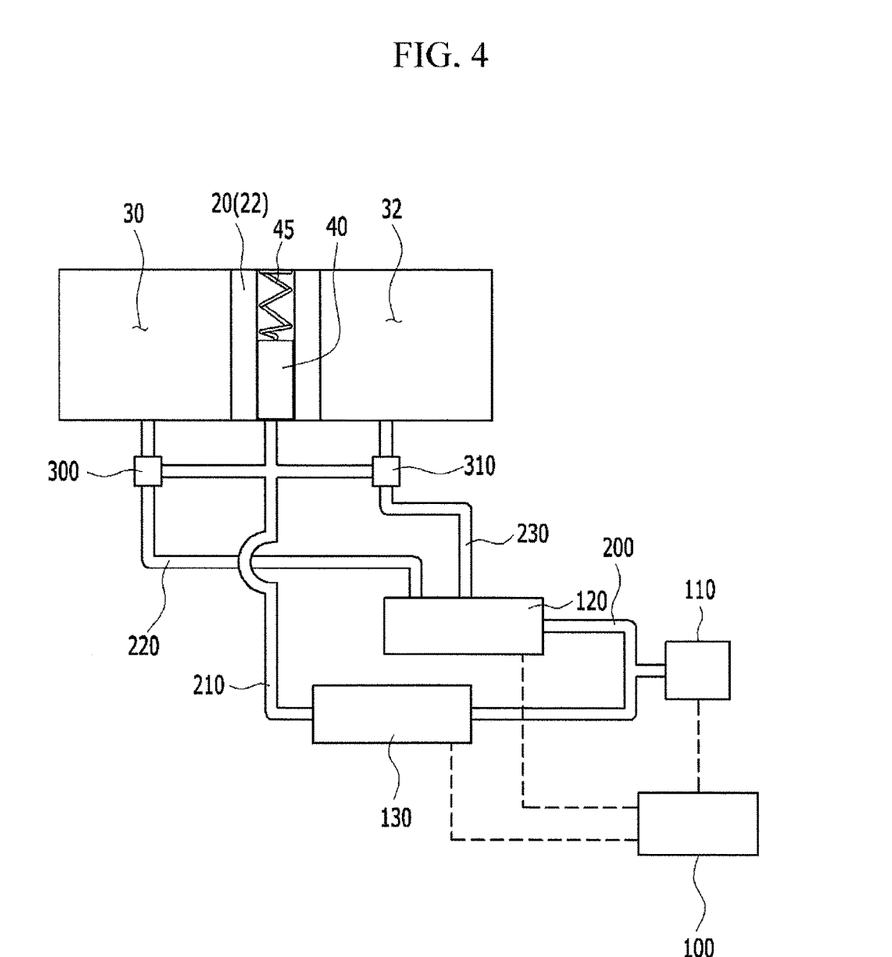
FIG. 4 and FIG. 5 are hydraulic circuit diagrams of an intermediate phase continuously variable valve timing system according to various embodiments of the present invention.
Figure 5:
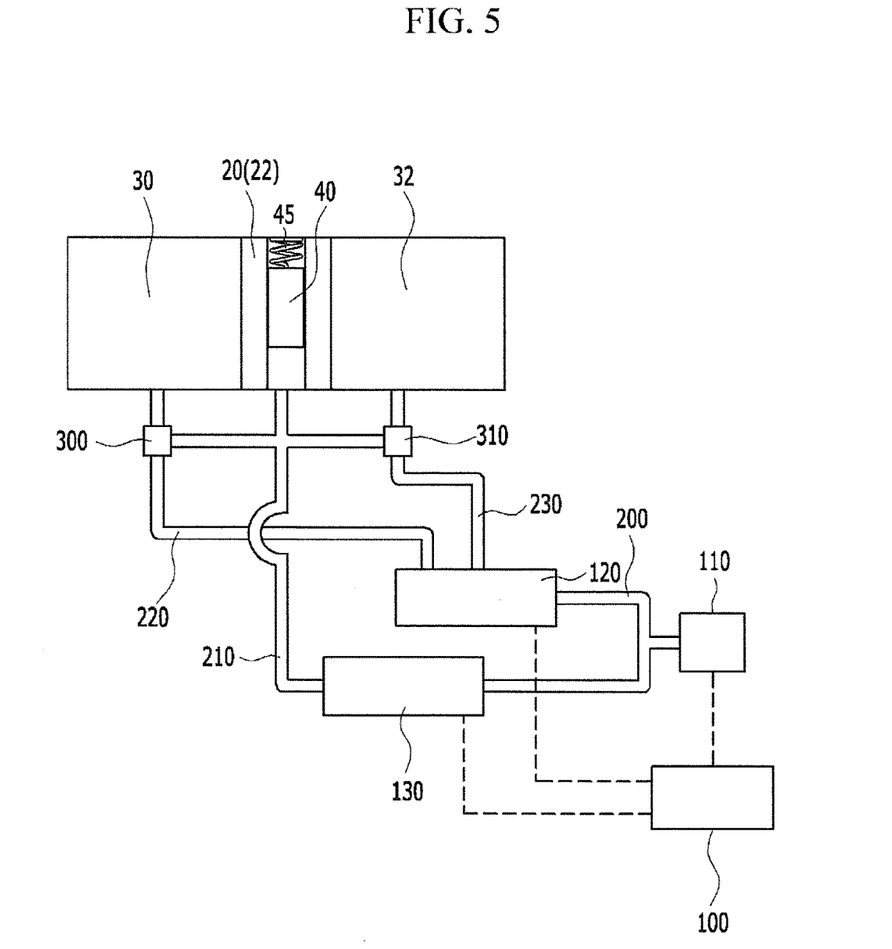

FIG. 4 and FIG. 5 are hydraulic circuit diagrams of an intermediate phase continuously variable valve timing system according to various embodiments of the present invention.

Referring to FIG. 4, and as shown in FIG. 5, the intermediate phase continuously variable valve timing system 1 according to various embodiments of the present invention further includes a lock pin 40, a controller 100, a hydraulic pressure supply 110, a rotor control valve 120, a lock pin control valve 130, a main oil passage 200, a lock pin control oil passage 210, a first rotor control oil passage 220, a second rotor control oil passage 230, a first duty-control valve 300, and a second duty-control valve 310.

The lock pin 40 is operated to selectively park the rotor 20 depending on supplied hydraulic pressure. At this time, a parking position of the rotor 20 by the lock pin 40 is in the intermediate phase. In addition, the operation of the lock pin 40 by the hydraulic pressure is for a limp-home control of the intermediate phase CVVT system 1 and is separately performed with an electrical operation of the lock pin 40 by a solenoid.

The controller 100 may be an electronic control unit (ECU) generally controlling electronic devices of a vehicle.

The hydraulic pressure supply 110 supplies hydraulic pressure being required for operation of the intermediate phase CVVT system 1 according to control of the controller 100.

The rotor control valve 120 is disposed to receive hydraulic pressure from the hydraulic pressure supply 110. In addition, the rotor control valve 120 adjusts hydraulic pressure being supplied to the first chamber 30 and the second chamber 32 depending on the control of the controller 100, such that the rotor 20 relatively rotates with respect to the stator 10.

The lock pin control valve 130 is disposed to receive hydraulic pressure from the hydraulic pressure supply 110. In addition, the lock pin control valve 130 adjusts hydraulic pressure being supplied to the lock pin 40 depending on the control of the controller 100 such that the lock pin 40 performs or releases the parking of the rotor 20. Further, the lock pin 40 releases the parking of the rotor 20 when receiving hydraulic pressure equal to or more than a set value from the lock pin control valve 130, and performs the parking of the rotor 20 when receiving hydraulic pressure less than the set value. Furthermore, in case that the lock pin 40 receives hydraulic pressure less than the set value, the parking of the rotor 20 may be performed by an elastic member 45 which pushes the lock pin 40 toward a direction facing the hydraulic pressure.

The main oil passage 200 is adapted that one end thereof is communicated with the hydraulic pressure supply 110 and the other end thereof is branched into two so as to be respectively communicated with the rotor control valve 120 and the lock pin control valve 130 such that the rotor control valve 120 and the lock pin control valve 130 receive hydraulic pressure from the hydraulic pressure supply 110.

The lock pin control oil passage 210 is adapted that one end (i.e., a first end) thereof is communicated with the lock pin control valve 130 and the other end thereof is branched into three so as to be communicated with the lock pin 40 through one of the three branches, such that the lock pin 40 receives hydraulic pressure from the lock pin control valve 130. Herein, the two other branched ends of the lock pin control oil passage 210 which are not the end communicated with the lock pin 40 will be described later.

The first rotor control oil passage 220 is adapted that one end thereof is communicated with the rotor control valve 120 and the other end thereof is communicated with the first chamber 30 such that the first chamber 30 receives hydraulic pressure from the rotor control valve 120.

The second rotor control oil passage 230 is adapted that one end thereof is communicated with the rotor control valve 120 and the other end thereof is communicated with the second chamber 32 such that the second chamber 32 receives hydraulic pressure from the rotor control valve 120.

The first duty-control valve 300 is interposed on the first rotor control oil passage 220 so as to duty-control hydraulic pressure being supplied into the first chamber 30. Herein, one of the two other ends (i.e., a second end) of the lock pin control oil passage 210, which are not the end communicated with the lock pin 40 (i.e., the first end), is communicated with the first duty-control valve 300. In addition, the first duty-control valve 300 duty-controls hydraulic pressure being supplied through the first rotor control oil passage 220 and hydraulic pressure being supplied from the lock pin control oil passage 210 so as to transmit it into the first chamber 30.

The second duty-control valve 310 is interposed on the second rotor control oil passage 230 so as to duty-control hydraulic pressure being supplied into the second chamber 32. Herein, the other one of the two other ends (i.e., a third end) of the lock pin control oil passage 210, which are not the end communicated with the lock pin 40 (i.e., the first end), is communicated with the second duty-control valve 310. In addition, the second duty-control valve 310 duty-controls hydraulic pressure being supplied through the second rotor control oil passage 230 and hydraulic pressure being supplied from the lock pin control oil passage 210 so as to transmit it into the second chamber 32.

In FIG. 4, a state that the rotor 20 is parked by the lock pin 40 is illustrated.

The lock pin 40 maintains the state of parking the rotor 20 when the lock pin control valve 130 blocks supply of hydraulic pressure on a state that the first duty-control valve 300 and the second duty-control valve 310 are closed.

Meanwhile, the lock pin 40 maintains the state of parking the rotor 20 when hydraulic pressure being supplied from the lock pin control valve 130 to the lock pin 40 is less than the set value on a state that the first duty-control valve 300 and the second duty-control valve 310 are opened. In addition, hydraulic pressure being supplied to the first chamber 30 and the second chamber 32 by opening the first duty-control valve 300 and the second duty-control valve 310 do not relatively rotate the rotor 20 but perform an assist-control for ensuring stability.

In FIG. 5, a state that the lock pin 40 releases the parking of the rotor 20 is illustrated.

The lock pin 40 releases the parking of the rotor 20 when hydraulic pressure being supplied from the lock pin control valve 130 to the lock pin 40 is equal to or more than the set value on a state that the first duty-control valve 300 and the second duty-control valve 310 are opened. In addition, hydraulic pressure being supplied into the first chamber 30 and the second chamber 32 by opening the first duty-control valve 300 and the second duty-control valve 310, relatively rotate the rotor 40.

Herein, the valve performing duty-control can be variously applied according to desired design requirements such that the rotor control valve 120 and the lock pin control valve 130 duty-controls hydraulic pressure and the first duty-control valve 300 and the second duty-control valve 310 only open or close the oil passages.

Figure 6:
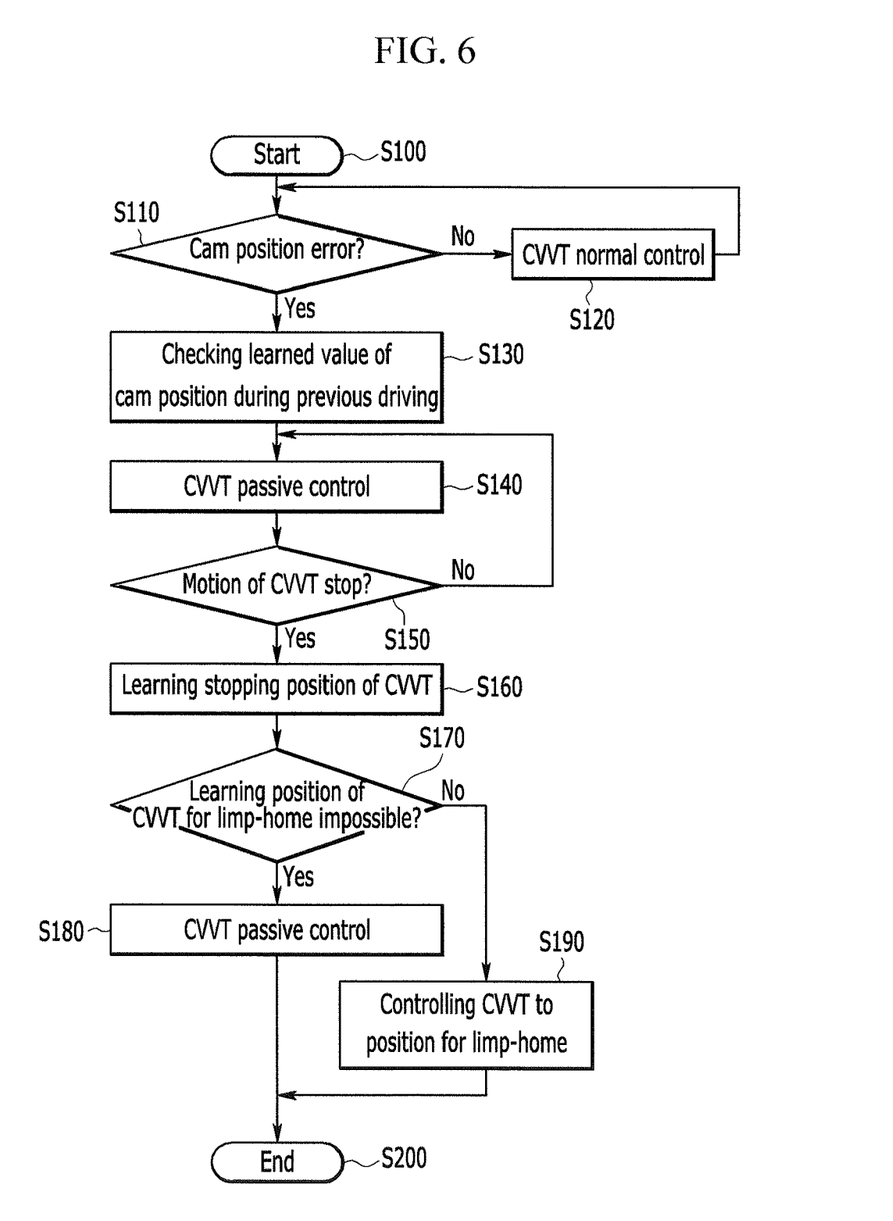
FIG. 6 and FIG. 7 are flowcharts of a method of controlling a continuously variable valve timing system for limp-home according to various embodiments of the present invention.
Figure 7:
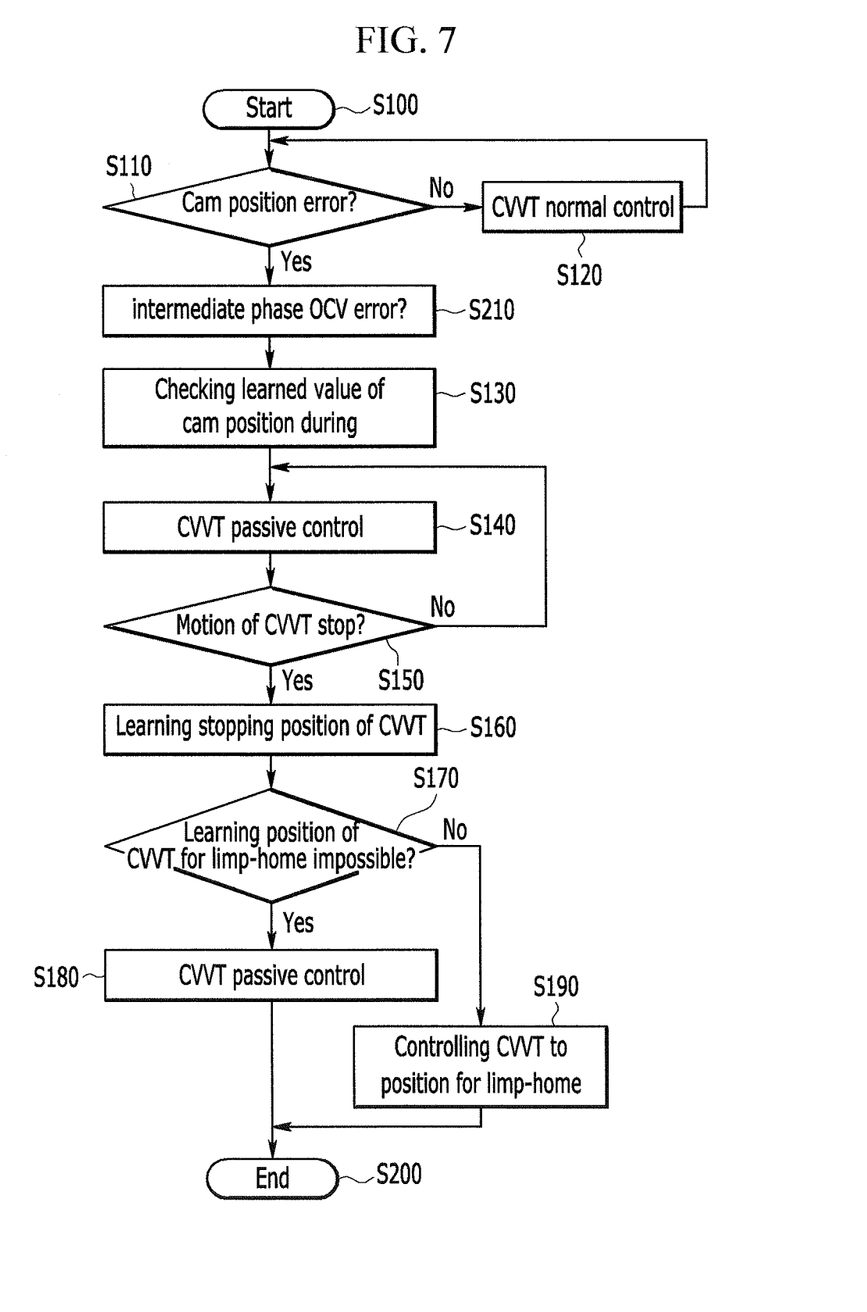

FIG. 6 and FIG. 7 are flowcharts of a method of controlling a continuously variable valve timing system for limp-home according to various embodiments of the present invention.

As shown in FIG. 6, when starting an engine at a step S100, the controller 100 determines whether there is error of a cam position at a step S110. Determining whether there is an error of a cam position is performed based on a reference position of a cam which is learned beforehand (i.e., predetermined). That is, a learned value about a reference position is stored in the controller 100. The reference position of the cam predetermined as range of the cam position to require a control by the CVVT system 1 according to an operational state of an engine, and the controller 100 determines that the CVVT system 1 is operated normally (i.e., as a regular CVVT system) if the cam is positioned in range of the reference position.

If it is determined that there is no error of a cam position at the S110, the intermediate phase CVVT system 1 is normally controlled at the S120 and step S110 is repeated.

The controller 100 checks a learned value about a position of the cam during a previous driving at a step S130 if it is determined that there is an error of a cam position at the S110. That is, the controller 100 consistently learns a current position of the cam during the time from start to stop of an engine, and stores a learned position. In addition, when a method of controlling a continuously variable valve timing system for limp-home is started as an engine is again started, a learned value about the cam position stored during a previous driving is checked at step S130.

If a learned value about a position during a previous driving of the cam is checked, a passive control of the intermediate phase CVVT system 1 is performed based on the learned value at a step S140. That is, the passive control of step S140 is to control the intermediate phase CVVT system 1 such that the cam position is to be a cam position which is controlled to be suitable to operational state of the engine during previous driving. The passive control is well known to a person of an ordinary skill in the art, so detailed description thereof will be omitted.

The controller 100 determines whether a motion of the intermediate phase CVVT system 1 is stopped at step S150 while a passive control of the intermediate phase CVVT system is performed at step the S140.

If it is determined that the intermediate phase CVVT system 1 is moved (i.e., not stopped) at step the S150, step S140 is repeated.

If it is determined that a motion of the intermediate phase CVVT system 1 is stopped at step S150, the controller 100 learns the position that the intermediate phase CVVT system 1 is stopped at a step S160.

If the position that the intermediate phase CVVT system 1 is stopped is learned at step S160, the controller 100 tries to learn a position for limp-home of the intermediate phase CVVT system 1 and determines whether learning of a position for limp-home of the intermediate phase CVVT system 1 is not possible at a step S170.

If learning the position for limp-home of the intermediate phase CVVT system 1 is not possible at step the S170, a passive control of the intermediate phase CVVT system 1 is performed at a step S180. The passive control of step S180 is to make a maximal advance position or a maximal retardation position of the cam. The passive control is well known to a person of an ordinary skill in the art, so detailed description thereof will be omitted.

Controlling the intermediate phase CVVT system 1 for limp-home ends at a step S200 when the engine starting is stopped while the cam is driven on a maximal advance position or a maximal retardation position as the passive control of the intermediate phase CVVT system 1 is performed at step S180.

If learning the position for limp-home of the intermediate phase CVVT system 1 is possible at step S170, the controller 100 controls the intermediate phase CVVT system 1 to move to the learned position for limp-home of the intermediate phase CVVT system 1 at a step S190. Controlling the intermediate phase CVVT system 1 for limp-home ends at step S200 when the engine starting is stopped while the cam is driven on the position for limp-home as controlling of the position for limp-home of the intermediate phase CVVT system 1 is performed.

As shown in FIG. 7, a method of controlling a continuously variable valve timing system for limp-home according to various embodiments of the present invention further includes a step S210 of determining whether there is an error of the lock pin control valve 130 by the controller 100.

The controller 100 determines whether there is an error of the lock pin control valve 130 at a step S210 if it is determined that there is an error of a cam position at the S110. At this time, there is no difference of the method of controlling a continuously variable valve timing system for limp-home at a next step in the case of determining that there is an error of the lock pin control valve 130 and the case of determining that there is no error of the lock pin control valve 130, and a method of noticing an error of the lock pin control valve 130 to a driver may be realized such that required repair and maintenance are determined easily.

In other words, a control method performing a different fail-safe control according to whether there is an error of the lock pin control valve 130 is applied conventionally, but a method of controlling a continuously variable valve timing system for limp-home according to various embodiments of the present invention performs a uniform control regardless of an error of the lock pin control valve 130.

Hereinafter, the position for limp-home of the intermediate phase CVVT system 1 will be described.

According to various embodiments of the present invention, the maximal advance position is the position for limp-home of the intermediate phase CVVT system 1 in the case that the stopping position of the intermediate phase CVVT system 1 during the passive control of the intermediate phase CVVT system 1 at step the S140 is a position of relatively moving the stator 10 toward an advance direction (A) (referring to FIG. 1A and FIG. 2.).

In addition, the maximal retardation position is the position for limp-home of the intermediate phase CVVT system 1 in the case that the stopping position of the intermediate phase CVVT system 1 during the passive control of the intermediate phase CVVT system 1 at step S140 is a position of relatively moving the stator 10 toward a retardation direction (R) (referring to FIG. 1C and FIG. 2.).

Further, the parking position of the rotor 20 is just the position for limp-home of the intermediate phase CVVT system 1 in case that the stopping position of the intermediate phase CVVT system 1 during the passive control of the intermediate phase CVVT system 1 at step S140 is the parking position of the rotor 20 (referring to FIG. 1B). At this time, the position of the rotor 20 for determining that the stopping position of the intermediate phase CVVT system 1 during the passive control of the intermediate phase CVVT system 1 at step S140 is the parking position of the rotor 20, is within a predetermined range.

According to various embodiments of the present invention, a predetermined position between the parking position of the rotor 20 and the maximal advance position is the position for limp-home of the intermediate phase CVVT system 1 in the case that the stopping position of the intermediate phase CVVT system 1 during the passive control of the intermediate phase CVVT system 1 at step the S140 is a position of relatively moving the stator 10 toward an advance direction (A).

In addition, a predetermined position between the parking position of the rotor 20 and the maximal retardation position is the position for limp-home of the intermediate phase CVVT system 1 in the case that the stopping position of the intermediate phase CVVT system 1 during the passive control of the intermediate phase CVVT system 1 at step S140 is a position of relatively moving the stator 10 toward a retardation direction (R).

Furthermore, the parking position of the rotor 20 is just the position for limp-home of the intermediate phase CVVT system 1 in the case that the stopping position of the intermediate phase CVVT system 1 during the passive control of the intermediate phase CVVT system 1 at step S140 is the parking position of the rotor 20.

Meanwhile, the position for limp-home of the intermediate phase CVVT system 1 is realized by controlling a difference between hydraulic pressure in the first chamber 30 and hydraulic pressure in the second chamber 32.

According to various embodiments of the present invention, safety can be ensured as the limp-home mode is performed when an error of the cam or simultaneous errors of the cam and the intermediate phase oil control valve (OCV) are generated.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a continuously variable valve timing system, which selectively controls opening and closing timing of a valve according to rotation of a cam by changing a phase between a rotor and a stator, and is configured so that the rotor is selectively parked through a lock pin, for limp-home, the method comprising:
   determining, by a controller, whether there is an error of a position of the cam;
   performing, by the controller, a passive control based on a value learned about the position of the cam during previous driving when it is determined that there is the error of the position of the cam;
   determining, by the controller, whether a motion of the continuously variable valve timing system is stopped while the passive control is performed based on the value learned about the position of the cam during the previous driving;
   learning, by the controller; a stopping position of the continuously variable valve timing system when it is determined that the motion of the continuously variable valve timing system is stopped; and
   learning, by the controller; a position for the limp-home of the continuously variable valve timing system and then controlling, by the controller, the continuously variable valve timing system to the learned position for the limp-home.

2. The method of claim 1, wherein the controller performs the controlling of the continuously variable valve timing system to the learned position for the limp-home regardless of an error relating to controlling of the lock pin.

3. The method of claim 1, wherein the determining the error of the position of the cam is performed based on a predetermined reference position of the cam.

4. The method of claim 1, wherein the continuously variable valve timing system is controlled without the passive control when it is determined that there is no error of the position of the cam.

5. The method of claim 1, wherein the passive control based on the value learned about the position of the cam during the previous driving is continuously performed when it is determined that the continuously variable valve timing system is moved.

6. The method of claim 1, wherein the passive control is performed such that the cam is set to a maximal advance position or a maximal retardation position when learning about the position for the limp-home of the continuously variable valve timing system is not possible.

7. The method of claim 1, wherein the determining whether there is the error of the position of the cam is simultaneously started with an engine starting.

8. The method of claim 1, wherein the controlling the continuously variable valve timing system to the learned position tor the limp-home is ended when an engine starting is stopped.

9. The method of claim 6, wherein the maximal advance position is the position for the limp-home when the stopping position of the continuously variable valve timing system during the passive control of the continuously variable valve timing system is a position of moving the stator toward an advance direction.

10. The method of claim 6, wherein the maximal retardation position is the position for the limp-home when the stopping position of the continuously variable valve timing system during the passive control of the continuously variable valve timing system is a position of moving the stator toward a retardation direction.

11. The method of claim 1, wherein a parking position of the rotor is the position for the limp-home when the stopping position of the continuously variable valve timing system during the passive control of the continuously variable valve timing system is the parking position of the rotor.

12. The method of claim 11, wherein a predetermined position between the parking position of the rotor and a maximal advance position of the cam is the position the limp-home when the stopping position of the continuously variable valve timing system during the passive control of the continuously variable valve timing system is a position of moving the stator toward an advance direction.

13. The method of claim 11, wherein a predetermined position between the parking position of the rotor and a maximal retardation position of the cam is the position for the limp-home when the stopping position of the continuously variable valve timing system during the passive control of the continuously variable valve timing system is a position of moving the stator toward a retardation direction.

14. The method of claim 11, wherein the position of the rotor for determining that the stopping position of the continuously variable valve timing system is the parking position of the rotor is within a predetermined range.

15. The method of claim 11,
wherein the continuously variable valve timing system includes the rotor, the stator, a vane, and the lock pin selectively parking the rotor,
wherein the vane is fixed to the rotor and the rotor is rotatably mounted to the stator,
wherein the phase between the rotor and the stator is changed as the vane moves, and
wherein the controller is configured to control operation of the lock pin.

* * * * *